May 2, 1933.  L. FRANDSEN  1,906,744
HOLLOW BRICK OR TILE MOLDING MACHINE
Filed Oct. 26, 1931    2 Sheets-Sheet 1

Inventor
Lars Frandsen
By Martin C. Smith
Attorney.

May 2, 1933.  L. FRANDSEN  1,906,744
HOLLOW BRICK OR TILE MOLDING MACHINE
Filed Oct. 26, 1931    2 Sheets-Sheet 2
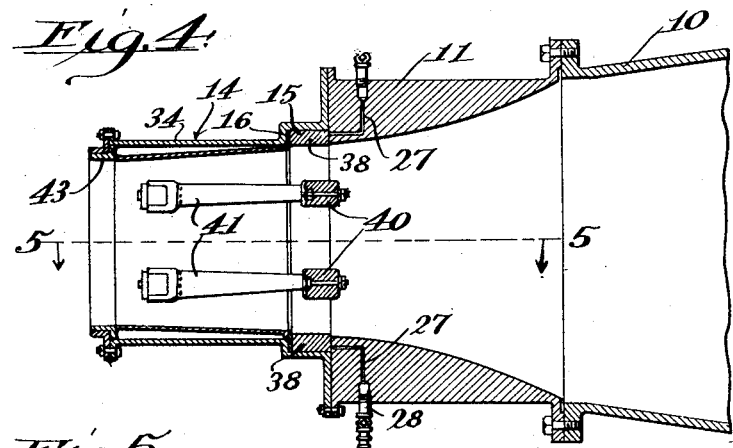
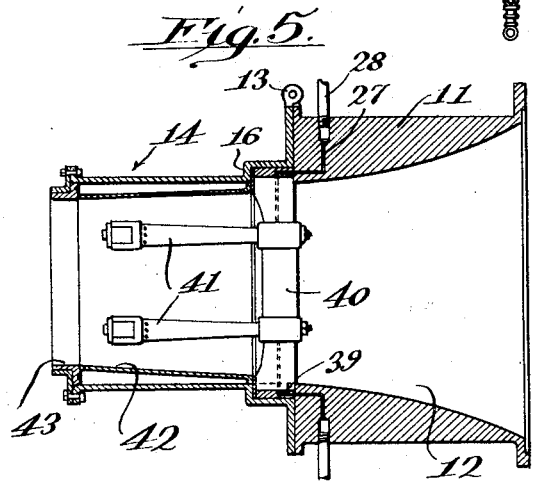
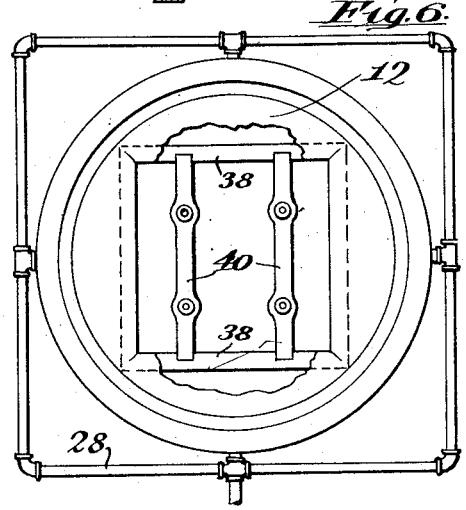
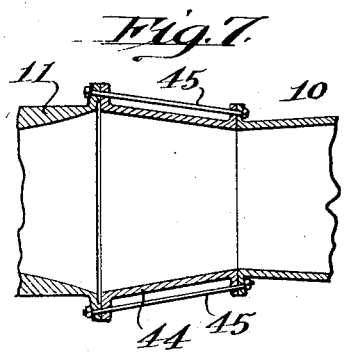
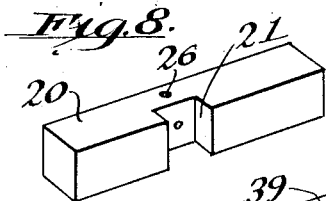
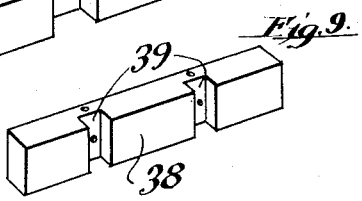
Inventor
Lars Frandsen
By Martin O. Smith
Attorney.

Patented May 2, 1933

1,906,744

UNITED STATES PATENT OFFICE

LARS FRANDSEN, OF LOS ANGELES, CALIFORNIA

HOLLOW BRICK OR TILE MOLDING MACHINE

Application filed October 26, 1931. Serial No. 571,038.

My invention relates to a machine for molding hollow brick or tile and the machine herein illustrated and described is an improvement on a similar machine that forms the subject matter of my co-pending application for United States Letters Patent filed March 19, 1929, Serial Number 348,186.

The principal objects of my present invention are, to generally improve upon and simplify the construction of the machine disclosed in my co-pending application and to provide an improved construction wherein the anchors for the cores that extend partially through the mold or die are located wholly within the mold housing and the latter being hinged to a material delivery throat in order that it may be readily opened to give convenient access to the core anchors, cores and the mold or die into which the cores project.

Further objects of my invention are, to generally improve upon and simplify the construction of the molding machine disclosed in my aforesaid application for patent, to construct the mold housing with a shoulder adjacent to its receiving end, which shoulder serves as a support for interchanging blocks that receive the ends of the core anchors, further, to provide molds or dies that are removably positioned within the mold housing in order that hollow brick and tile of varying sizes and shapes may be produced and further, to arrange in the outlet end of the mold housing a removable external finishing die.

A further object of my invention is, to provide an adapter that may be readily positioned between the discharge end of the clay or mud mixing machine and the housing to which the core and mold carrying member is hinged so that by reversing the adapter my improved apparatus may be utilized with clay or mud mixing machines of different sizes.

With the foregoing and other objects in view, my invention consists in certain novel features of construction and arrangement of parts that will hereinafter be more fully described and claimed and illustrated in the accompanying drawings, in which:

Fig. 4 is a vertical longitudinal section taken through the center of a machine of my improved construction and which is provided with a plurality of cores.

Fig. 5 is a horizontal section taken on the line 5—5 of Fig. 4.

Fig. 6 is a front elevational view of the form of machine illustrated in Figs. 4 and 5.

Fig. 7 is a sectional view of the adapter forming a part of my invention.

Figs. 8 and 9 are perspective views of blocks that are removably positioned in the receiving end of the mold or die housing.

Figure 1:
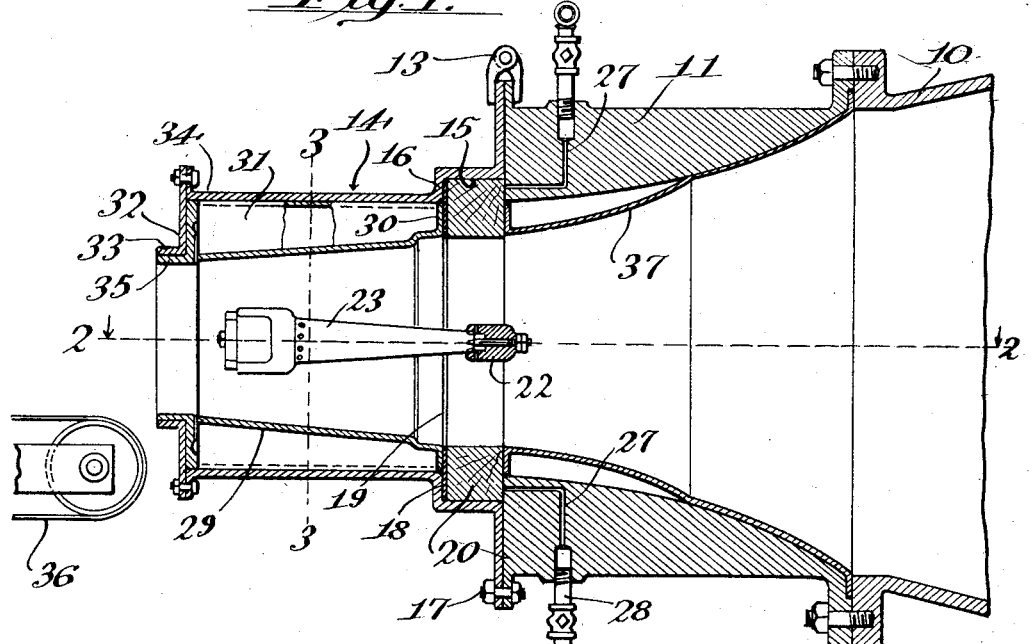
Fig. 1 is a vertical longitudinal section taken through a molding machine of my improved construction and which machine is provided with a single core.
Figure 2:
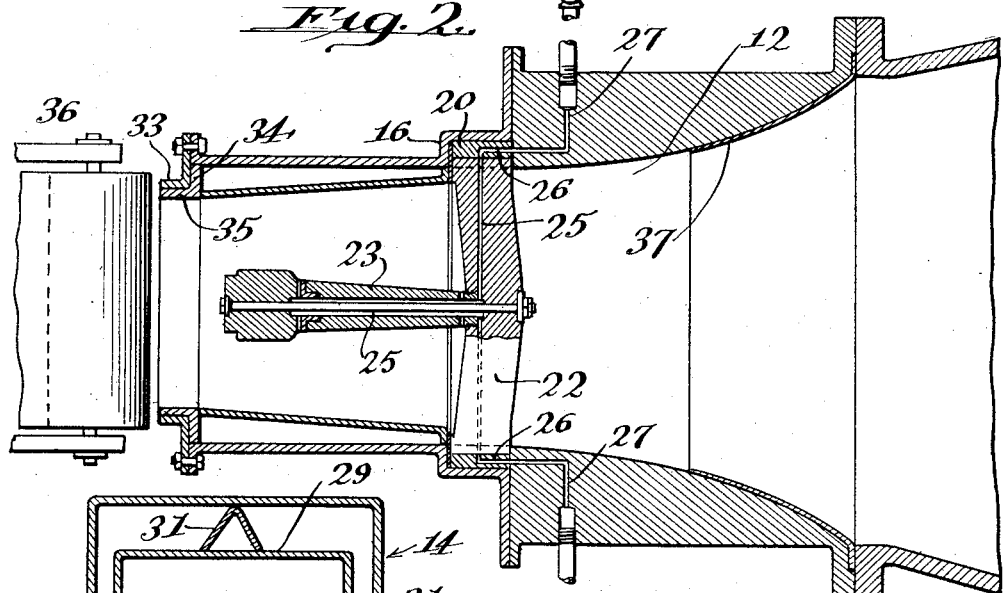
Fig. 2 is a horizontal section taken on the line 2—2 of Fig. 1.
Figure 3:
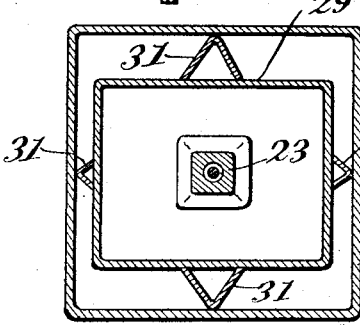
Fig. 3 is a cross section taken on the line 3—3 of Fig. 1.

Referring by numerals to the accompanying drawings which illustrate a practical embodiment of my invention, 10 designates the discharge end of a machine of the standard type and which is used for mixing clay or mud that is to be shaped into hollow brick or tile and detachably connected to the discharge end of said machine is a substantially rectangular housing 11 having a tapered throat 12, that receives the mixed clay or mud from the discharge end of the machine 10.

Connected by suitable hinges 13 to one side of the forward end of housing 11 is a substantially rectangular hollow mold or die housing 14 and formed in the end thereof that is immediately adjacent to the end of the housing 11, is a recess 15, at the bottom of which is formed a shoulder 16 that extends entirely around the housing.

Suitable means, preferably a bolt 17, may be utilized for securing the inner end of housing 14 to the end of housing 11 on the side opposite from the hinges and thus when the housing 14 is closed against the end of housing 11, it constitutes an extension thereof.

Removably seated in the recess 15, directly upon the shoulder 16, is a thin plate 18 of metal, provided with a centrally arranged opening 19, and positioned against said plate and filling the recess 15, are blocks 20 of wood of such thickness that their inner edges coincide with the edges of opening 19 in plate 18.

Formed in the inner faces of the members of an oppositely disposed pair of these blocks 20, are rectangular notches 21 that are adapted to receive the ends of a horizontally disposed core anchor 22.

This core anchor 22 and the core 23, that is carried thereby, is practically identical in construction with the core anchor and core that is disclosed and claimed in my hereinbefore mentioned co-pending application Serial No. 348,186, and said anchor and core are provided with fluid circulation ducts 25 that communicate with a duct 26 that is formed in the center of one of the blocks 20 and which last mentioned duct communicates with the duct 27 formed in housing 11, and which latter receive fluid from a suitably arranged supply pipe 28.

Removably positioned within the housing 14, is a mold or die 29 provided on its inner end with an outwardly presented flange 30 that bears directly against plate 18 and the opening through said mold or die gradually decreases in size toward its outer end.

In order to strengthen and reenforce this mold or die and to retain the same firmly within the housing 14, longitudinally disposed ribs 31 are formed on the external faces of said mold or die and the outer edges of these ribs bear directly against the inner faces of the housing 14.

Detachably secured in any suitable manner to the outer end of housing 14, is a plate 32 in the center of which is formed an opening that is surrounded by an outwardly projecting flange 33 and removably positioned between the inner face of this plate 32 and the outer mold or die 29, is a plate 34, provided with a centrally arranged opening that coincides with the open end of mold or die 29 and surrounding this opening is an outwardly projecting flange 35 that fits against the flange 33 on plate 32.

This plate 34 and flange 35 constitute a finishing die for the extruded material and if desired the face of flange 35 may be provided with longitudinally disposed grooves or ribs and which impart corresponding shape to the external surfaces of the brick or tile that discharges from the mold or die.

The mold or die is arranged so that it discharges the hollow brick or tile directly unto an endless conveyer such as 36.

If desired a lining 37 of metal may be removably positioned within throat 12 of housing 11 and the small end of this lining coincides with and fits directly against the faces of the blocks 20 that are positioned in the recess 15.

The form of apparatus heretofore described is especially designed for forming hollow bricks or tiles having a single longitudinally disposed opening and the construction illustrated in Figs. 4, 5, 6 and 9 is designed for producing bricks or tiles having a plurality of openings.

Where the latter form of brick or tile are produced, the removable lining 37 within throat 12 is dispensed with and relatively thin blocks 38 are arranged within the recess 20 and the inner faces of the opposite members of a pair of these blocks are provided with notches or recesses 39 for the reception of the ends of the core anchors 40, the latter being practically identical in construction with the core anchors 22 with the exception that each anchor 40 carries a pair of cores 41 that are identical in construction with the cores 23.

Removably positioned in the housing 14 is a die or mold 42 and removably located at the discharge end of the latter is a finishing die 43 that is practically identical in construction with the finishing die 34—35, but having a larger discharge opening.

In order to enable my improved molding machine to be readily associated with clay or mud mixing machines of different sizes, an adapter of the type disclosed in Fig. 7 may be used and which adapter comprises a relatively short tapered tubular member 44 that is interposed between the discharge end of the machine 10 and the receiving end of housing 11. This adapter is connected to the parts 10 and 11 in any suitable manner, but preferably by bolts 45.

In the use of my improved brick or tile molding machine, the clay or mud is discharged in the usual manner from mixing machine 10 and this clay or mud passes through throat 12, thence through the opening between the blocks 20 around anchor 22 and thence through the die or mold 29 around the core 23 and in thus passing through the die or mold and around the core, the plastic material is given the proper shape and the shaped material finally discharges through the finishing die 34—35 and passes into the endless carrier 36.

During the passage of the plastic material through the die, the necessary lubrication is provided by water that passes from supply pipe 28 through ducts 27 and 25.

When it is desired to change the shape of the brick or tile, housing 14 may be readily swung on the hinges 13 to one side so as to permit blocks 20, mold or die 29, core anchor 22 and cores 23, to be easily and quickly removed from the housing 19 and replaced by other parts which give different external and internal shape to the material that passes through the machine.

By utilizing blocks 20 and liners 29 of different shapes and sizes and combined therewith a different number of core anchors and cores, hollow bricks or tiles of different shapes and sizes may be readily produced.

By removing plate 33 and finishing die 34, the main forming die 24 may be readily removed from the housing 14 and a die of different shape inserted, thereby effecting a material saving of time and labor incident to the interchanging of dies and when such operation is carried out it is not necessary to remove the bolts 17 and swing the housing 14 outwardly upon hinge 13.

Thus it will be seen that I have provided a hollow brick or tile molding machine that is relatively simple in construction, inexpensive of manufacture, capable of being readily converted so as to produce finished products of different sizes and shapes and which machine is very effective in performing the functions for which it is intended.

It will be understood that minor changes in the size, form and construction of the various parts of my improved hollow brick or tile molding machine may be made and substituted for those herein shown and described without departing from the spirit of my invention, the scope of which is set forth in the appended claims.

I claim as my invention:

1. In a hollow brick or tile molding machine, the combination with a housing provided with a throat, of a housing hinged to said first mentioned housing, said hinged housing being provided in its end adjacent to the end of the first mentioned housing, with a recess, blocks removably arranged in said recess, the inner faces of certain of which blocks are provided with notches, a core anchor having its ends seated in the notches in said blocks and a core carried by said core anchor and projecting into the hinged housing.

2. A hollow brick or tile molding machine as set forth in claim 1, with a die removably arranged within said hinged housing to the rear of the blocks therein.

3. A hollow brick or tile molding machine as set forth in claim 1, with a die removably arranged within said hinged housing and a finishing die arranged within said housing at the end of said removable die.

4. In a hollow brick or tile molding machine, a housing provided with a throat, a die housing hinged to said first mentioned housing, a series of blocks removably positioned in the end of the hinged housing adjacent to the discharge end of the throat, a core anchor supported by a pair of said blocks and a core projecting from said anchor.

5. A hollow brick or tile molding machine as set forth in claim 4, and said blocks, core anchor and core being provided with lubricating fluid circulation ducts.

6. A hollow brick or tile molding machine as set forth in claim 4, with a die removably positioned within said hinged housing and a finishing die removably positioned in the end of said hinged housing and surrounding the open end of said removable die.

7. In a hollow brick or tile molding machine, a housing provided with a throat, a die housing hinged to said first mentioned housing and provided adjacent to its hinged end with an internal shoulder, a plurality of blocks removably arranged within said die housing and resting upon said shoulder, a core anchor supported by a pair of said blocks and a core projecting from said anchor into said housing.

8. A hollow brick or tile molding machine as set forth in claim 7, and with an open ended die removably positioned within the die housing to the rear of the blocks therein.

9. In a hollow brick or tile molding machine, a hinged die housing, a die removably positioned within said housing and longitudinally disposed reenforcing ribs formed on the exterior of said die.

10. In a hollow brick or tile molding machine, a mold housing, a plurality of blocks removably positioned in one end of said housing, a core anchor detachably supported by a pair of said blocks, a core projecting from said anchor, a die removably positioned within said housing and surrounding said core and longitudinally disposed reenforcing ribs on the exterior of said die.

In testimony whereof, I affix my signature.

LARS FRANDSEN.